United States Patent Office 2,940,975
Patented June 14, 1960

2,940,975

1-ARYLMETHYL-4-(QUATERNARY - AMMONIUM-ALKYLIMINO)-1,4-DIHYDROQUINOLINES

Alexander R. Surrey, Albany, N.Y., assignor to Sterling Drug Inc., New York, N.Y., a corporation of Delaware No Drawing. Filed June 19, 1957, Ser. No. 666,765

9 Claims. (Cl. 260—286)

This invention relates to compositions of matter of the class of basic quinoline derivatives, to their acid-addition salts, and to the preparation of these compounds.

The invention here resides in a composition of matter selected from the group consisting of: (a) a 1,4-dihydroquinoline that is substituted by a (monocarbocyclic-aryl)methyl radical at the 1-position and by a lower-(quaternary - ammonium)-(polycarbon-lower-alkyl)imino radical at the 4-position, and that can be further substituted by from one to two substituents selected from the group consisting of halo, lower-alkoxy, lower-alkylmercapto, lower-alkyl, nitro and trifluoromethyl radicals at one of the normally aromatic positions of the quinoline nucleus; and, (b) acid-addition salts thereof.

My compounds in free base form have the general Formula I

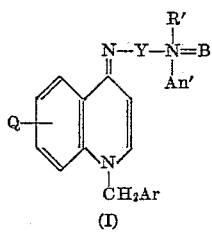

(I)

where Q represents H or from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, Y is a lower-alkylene radical having from two to four carbon atoms and having its connecting linkages on different carbon atoms, N=B is a lower-tertiary-amino radical, R' is a member selected from the group consisting of lower-alkyl and (monocarbocyclic-aryl)methyl radicals, An' is an anion and Ar is a monocarbocyclic-aryl radical.

In the above general Formula I the quinoline nucleus can be unsubstituted at the positions other than 1 and 4 or it can be substituted further at one of the normally aromatic positions of the quinoline ring, namely, 3, 5, 6, 7 or 8, by the substituents named above. When Q designates two substituents, they can be the same or different and can be in any of said available aromatic positions relative to each other. The halo substituents can be chloro, bromo, iodo or fluoro. The lower-alkoxy, lower-alkylmercapto and lower-alkyl substituents have preferably from one to six carbon atoms and include: methoxy, ethoxy, n-propoxy, isopropoxy, n-butoxy, isobutoxy, 2-butoxy, n-pentoxy, n-hexoxy and the like when lower-alkoxy; methylmercapto, ethylmercapto, n-propylmercapto, isobutylmercapto, n-hexylmercapto and the like when lower-alkylmercapto; and methyl, ethyl, n-propyl, isopropyl, n-butyl, isobutyl, 2-butyl, n-amyl, n-hexyl and the like when lower-alkyl.

The radical ArCH₂ comprehends (monocarbocyclic-aryl)methyl radicals where monocarbocyclic-aryl, designated as Ar, has six ring-carbon atoms and thus stands for an aryl radical of the benzene series. The aryl radical Ar includes the unsubstituted phenyl radical and phenyl radicals substituted by substituents including halo, nitro, lower-alkoxy, lower-alkyl, lower-alkylmercapto, trifluoromethyl, and the like. The substituted-phenyl radicals have preferably from one to three substituents including those given above; and, furthermore, these substituents can be in any of the available positions of the phenyl nucleus, and where more than one substituent, they can be the same or different and they can be in any of the various position combinations relative to each other. Thus ArCH₂ comprehends the unsubstituted-benzyl radical as well as substituted-benzyl radicals illustrated by nitrobenzyl radicals including 4-nitrobenzyl, 3-nitrobenzyl, 2-nitrobenzyl, etc.; (lower-alkoxylated)-benzyl including 3-ethoxybenzyl, 2-methoxybenzyl, 2,4-dimethoxybenzyl, 2,4,6-trimethoxybenzyl, 3,4-diethoxybenzyl, etc.; (lower-alkylated)-benzyl including 4-methylbenzyl, 3-ethylbenzyl, 2-methylbenzyl, 2,4-dimethylbenzyl, 3,4,5-trimethylbenzyl, 4-isopropylbenzyl, etc.; halogenated-benzyl including 2-chlorobenzyl, 4-chlorobenzyl, 2,4-dibromobenzyl, 3-iodobenzyl, 2,4-dichlorobenzyl, 3,4-dichlorobenzyl, 2,4,6-trichlorobenzyl, 4-fluorobenzyl, etc.; and other substituted-benzyl radicals including 3-trifluoromethylbenzyl, 4-methylmercaptobenzyl, and the like.

The lower-alkylene radical designated as Y has from two to four carbon atoms including $-CH_2CH_2-, -CH_2CH_2CH_2-, -CH_2CH_2CH_2CH_2-, -CH_2\overset{|}{C}HCH_3$ $-CH_2CH(CH_3)CH_2-, -CH_2\overset{|}{C}(CH_3)_2, -CH(CH_3)\overset{|}{C}HCH_3$ and the like.

When representing a lower-alkyl radical, R' has preferably from one to six carbon atoms and comprehends methyl, ethyl, n-propyl, isopropyl, n-butyl, isobutyl, 2-butyl, n-pentyl, isopentyl, n-hexyl, and the like.

When representing a (monocarbocyclic-aryl)methyl radical, which can be designated as Ar'CH₂, R' comprehends radicals of the same class as defined above for ArCH₂. For a given compound, Ar and Ar' can be the same or different.

The above designation N=B comprehends pharmacodynamically acceptable lower-tertiary-amino radicals, preferred embodiments being di-(lower-alkyl)amino radicals where the lower-alkyl radicals are alike or different and each alkyl radical has preferably from one to six carbon atoms, such dialkylamino radicals including dimethylamino, diethylamino, ethyl-methylamino, diisopropylamino, ethyl-n-propylamino, di-n-butylamino, di-n-hexylamino, and the like. The designation N=B also comprehends lower-tertiary-amino radicals wherein the nitrogen atom bears one lower-alkyl radical having from one to six carbon atoms as illustrated above and a second radical such as a cycloalkyl radical having from three to six ring-carbon atoms, a lower-hydroxyalkyl radical having from two to six carbon atoms or a (monocarbocyclic-aryl)methyl radical such as illustrated above for ArCH₂ and R', such lower-tertiary-amino radicals including ethyl-cyclohexylamino, ethyl-2-hydroxyethylamino, ethyl-(2-chlorobenzyl)amino, and the like. Further, N=B comprehends saturated N-heteromonocyclic radicals having five to six ring atoms, illustrated by 1-piperidyl; (lower-alkylated)-1-piperidyl including 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl including 2-methyl-1-pyrrolidyl, 3-ethyl-1-pyrrolidyl, 2,5-dimethyl-1-pyrrolidyl; 4-morpholinyl; and the like.

The anion designated above as An', which can be any pharmacodynamically acceptable anion, for instance, chloride, bromide, iodide, sulfate, phosphate, benzenesulfonate, para-toluenesulfonate, citrate, tartrate, and the like, has no appreciable activity of its own in the high dilutions at which the quaternary ammonium salts as a whole are effective. In particular, the anions appear to contribute nothing to the pharmacodynamic properties which inhere to the cation portion of the 1-arylmethyl-1,4-dihydroquinolines of the present invention. However, preferred compounds are those in which An' is halide, in particular, chloride, iodide or bromide; since these are derived from readily available starting materials. By a pharmacodynamically acceptable anion, I mean any anion which is innocuous to the animal organism in pharmacodynamic doses of the quaternary ammonium salt, so that beneficial physiological properties inherent in the cation are not vitiated by any possible side-effects ascribable to the anions; in other words, the latter do not substantially affect the pharmacodynamic properties inherent in the cations.

Preferred embodiments are my compounds in the form of their acid-addition salts, which can be represented by the general structural Formula II

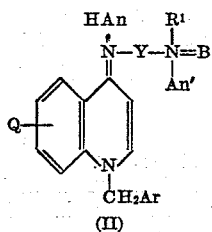

(II)

where Q, Y, N=B, R', An and Ar have the meanings given above; and An is an anion which has the same meaning given above for An' and can be the same as or different from An' for a given compound.

Concerning the structure of the acid-addition salts represented above as Formula II, the following considerations are presented. From chemical and physical data it appears that structure II is actually a resonance hybrid whose main contributing structures are represented as follows by A↔B:

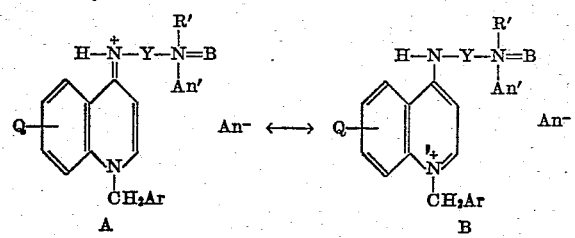

Since my compounds in free base form (Formula I) are readily obtained from their acid-addition salts by reaction with an acid-acceptor, as shown below, and since they are readily reconverted into their acid-addition salts by treatment with an acid, I prefer to represent the acid salt form by Formula II. As an illustration, I prefer to represent the hydrochloride salt of 7-chloro-1-(2-chlorobenzyl)-4-(2 - diethylaminoethylimino)-1,4-dihydroquinoline omega-(2-chlorobenzochloride) by the following structure Formula IIa ("omega" designating attachment of the 2-chlorobenzyl radical and chloride ion at the terminal nitrogen atom of the basic side-chain attached to the 4-position of the quinoline ring):

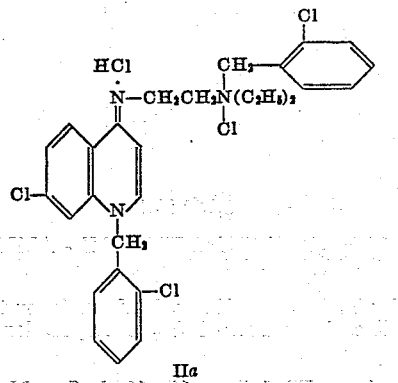

IIa

Alternatively, this compound can be named 7-chloro-1-(2-chlorobenzyl) - 4 - [2-(N-2-chlorobenzyl-N,N-diethylammonium)ethylamino]quinolinium dichloride or 7-chloro - 4 - (2-diethylaminoethylamino)quinoline bis(2-chlorobenzochloride) and can be represented by the structural Formula IIb

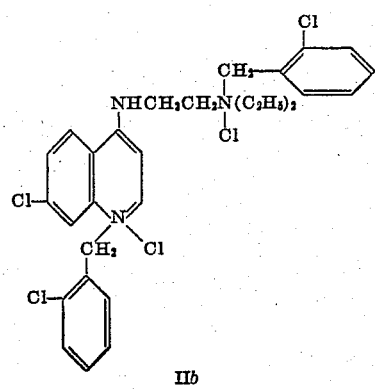

IIb

Thus, it is to be understood that although I prefer to represent the acid-addition salt form of my compounds by the structural formula designated above as II, i.e., as an acid-addition salt of a 1-aralkyl-4-(quaternary-ammonium-alkylimino)-1,4-dihydroquinoline salt, this 4-imino-1,4-dihydroquinoline structure actually represents only one of the contributing members of a resonance hybrid; and further, it is to be understood that the salt form of my invention comprehends not only this 4-imino-1,4-dihydroquinoline structure (as specifically illustrated above as IIa) but also other contributing members of the resonance hybrid including the 1-aralkyl-4-(quaternary-ammonium-alkylamino)-quinolinium salt structure (as specifically illustrated above as IIb).

The compounds of Formula II where R' is the same as ArCH₂ (and An and An' are the same) are conveniently prepared by reacting the corresponding 4-(tertiary-aminoalkylamino)quinoline of the Formula III

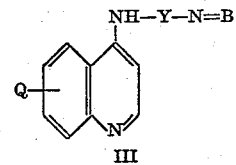

III where Q, Y and N=B have the meanings designated above, with at least two molar equivalents of a (monocarbocyclic-aryl)methyl ester of the formula ArCH₂-An and, if the compounds of Formula I are desired, then reacting the resulting acid-addition salt of the 1-[(monocarbocyclic-aryl)methyl] - 4 - (quaternary - ammonium-alkylimino)-1,4-dihydroquinoline salt (Formula II above) with an acid-acceptor to yield the product in free base form (Formula I). Thus, the reaction of 7-chloro-4-(2-diethylaminoethylamino)-3-nitroquinoline with two moles of 2-chloro-4-methoxybenzyl chloride yields the hydrochloride of 7-chloro-4-(2-diethylaminoethylimino)-1-(2-chloro - 4 - methoxybenzyl)-3-nitro-1,4-dihydroquinoline omega-(2-chloro-4-methoxybenzochloride) which when reacted with an acid-acceptor yields 7-chloro-4-(2-diethylaminoethylimino) - 1 - (2-chloro-4-methoxybenzyl)-3-nitro-1,4-dihydroquinoline omega - (2-chloro-4-methoxybenzochloride).

The step of reacting the 4-(tertiary-aminoalkylamino)-quinoline (Formula III) with the ester ArCH$_2$-An is carried out preferably by heating the reactants at a temperature between about 50° C. and 150° C., with a particularly preferred range being between about 80° C. and 120° C. The reaction can be run below 50° C., but it takes longer. The reaction is preferably carried out in an organic solvent which is inert under the conditions of the reaction as for example, acetonitrile, acetone, ethanol, and the like. If an inert solvent is used, the product usually separates from solution upon cooling, or can be obtained by concentration of the solution. The reaction takes place most readily with arylmethyl esters ArCH$_2$-An where An is the anion of a strong inorganic or an organic sulfonic acid. The chloride, bromide or iodide are preferred because of the more ready availability of the requisite arylmethyl halides. Compounds where the anion An (or An') is other than halogen can be prepared preferably by the procedure described below.

The step of reacting the acid-addition salt of the 1-arylmethyl-4-(quaternary-ammonium - alkylimino)-1,4-dihydroquinoline (Formula II) with an acid-acceptor is carried out at room temperature or by heating, if necessary, up to a temperature of about 100° C. The reaction can be carried out in an aqueous or organic solvent; however, it is preferably carried out in an organic solvent inert under the conditions of the reaction as for example, anhydrous methanol, ethanol, and the like. The purpose of the acid-acceptor is to take up the hydrogen halide (or HAn) which is split out during the course of the reaction. The acid-acceptor is a basic substance which preferably forms freely water-soluble by-products easily separable from the product of the reaction, including for example, sodium hydroxide, potassium hydroxide, sodium carbonate, potassium carbonate, sodium acetate, sodium alkoxides, potassium alkoxides, sodium amide, and the like.

The compounds of Formulas I and II where R' is not the same as ArCH$_2$ are prepared by reacting a 1-[(monocarbocyclic-aryl)-methyl]-4-(tertiary - aminoalkylimino)-1,4-dihydroquinoline having the Formula IV

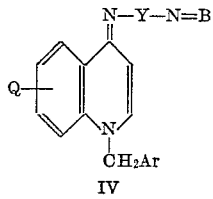

IV where Q, Y, N=B and Ar have the meanings designated above, with one molar equivalent of an ester having the formula R'-An', thereby yielding the product in free base form (Formula I). Use of an acid-addition salt of IV yields the product in the form of its acid-addition salt (Formula II). Thus, 1-benzyl-6,8-dichloro-4-(4-diethylaminobutylimino)-1,4-dihydroquinoline omega-(2-chlorobenzochloride) or 1-benzyl-6,8-dichloro-4-(4-diethylaminobutylimino)-1,4-dihydroquinoline omega-methochloride is formed by reacting 1-benzyl-6,8-dichloro-4(4-diethylaminobutylimino)-1,4-dihydroquinoline with one molar equivalent of 2-chlorobenzyl chloride or methyl chloride, respectively. Use of the hydrochloride of 1-benzyl-6,8-dichloro-4(4-diethylaminobutylimino) - 1,4 - dihydroquinoline in place of the free base form yields, respectively, 1-benzyl-6,8 - dichloro - 4 - (4 - diethylaminobutylimino)-1,4-dihydroquinoline omega-(2 - chlorobenzochloride) hydrochloride or 1-benzyl-6,8-dichloro-4-(4-diethylaminobutylimino) - 1,4 - dihydroquinoline omega - methochloride hydrochloride.

The reaction conditions for the reaction of the 1-arylmethyl-4-(tertiary-aminoalkylimino)-1,4-dihydroquinoline (Formula IV), or its acid-addition salt, with the ester R'-An are like those described hereinabove for the reaction of the corresponding 4-(tertiary-aminoalkylamino)-quinoline (Formula III) with two molar equivalents of the ester ArCH$_2$-An. As above, the preferred esters are those where An' is chloride, iodide or bromide.

The intermediate 1-[(monocarbocyclic-aryl)methyl]-4 - (tertiary - aminoalkylimino) - 1,4 - dihydroquinolines (Formula IV) and their acid-addition salts are disclosed and claimed in my co-pending application Serial No. 666,764, filed June 19, 1957.

Compounds of my invention where the anion An' is other than the anion of a strong acid, for example, nitrate, sulfate, phosphate, benzenesulfonate, etc., and in particular, where it is an anion derived from weak acids including acetate, citrate, tartrate, oleate, lactate, and the like, can be prepared from said compounds where An' is a halide ion. This procedure is carried out by treating the quaternary ammonium halide (Formula I) with silver oxide which produces the corresponding quaternary ammonium hydroxide, the halide ion being removed in the form of silver halide. The quaternary ammonium hydroxide can then be converted to any desired salt by neutralization with the appropriate acid. Reaction of the quaternary ammonium hydroxide with two molar equivalents of the acid results in the formation of the corresponding acid-addition salt (Formula II). Alternatively, the ion exchange can be effected by contact with an anion exchange resin saturated with the desired anion.

The acid-addition salts of my compounds (Formula II) where An is the same as An' and represents the anion of a strong acid and where R' is ArCH$_2$ are preferably prepared directly by the procedure described above, that is, by reacting the corresponding 4-(tertiary-aminoalkylamino)quinoline (Formula III) with two molar equivalents of an arylmethyl ester of the formula ArCH$_2$-An where An is preferably a halide ion. Salts where An is the anion of a strong or weak acid can be prepared by treating the corresponding compound in free base form (Formula I) with the appropriate acid, or by treating an acid-addition salt (Formula II) prepared directly as noted above with an anion exchange resin saturated with the desired anion (in the latter instance, An' will also be exchanged by the anion of the resin). Appropriate acid-addition salts are those derived from mineral acids including hydrochloric acid, hydrobromic acid, hydriodic acid, nitric acid, sulfuric acid and phosphoric acid; and organic acids including acetic acid, citric acid, lactic acid, and tartaric acid. The acid-addition salts are prepared from the free base form (Formula I) by dissolving the base (I) in an aqueous solution containing the appropriate acid and isolating the salt by evaporating the solution, or by reacting the free base and acid in an organic solvent, in which case the salt separates directly or can be obtained by concentrating the solution.

Evaluation of the compounds of my invention by standard test procedures has shown them to have useful pharmacodynamic properties, in particular, central hypotensive activity.

The following examples will further illustrate the invention, without the latter being limited thereto.

EXAMPLE 1

A. 4-[lower-(tertiary-amino)-alkylamino]-quinolines

These intermediate basic quinolines in the form of their free bases and acid-addition salts are generally known in the art. They are prepared by reacting the appropriate 4-haloquinoline with a tertiary-aminoalkylamine of the formula H$_2$N—Y—N=B where Y and N=B have the meanings given above. New compounds of this type that I prepared as intermediates for the synthesis of the 4-[lower-(tertiary-amino)-alkylimino] - 1-arylmethyl-1,4-dihydroquinolines of my invention are given in Table A.

TABLE A

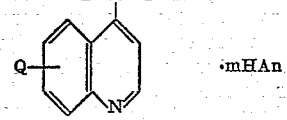

H—N—Y—N=B

Q— (quinoline) ·mHAn

| Q | Y—N=B | mHAn | M.P., °C., corr. |
|---|---|---|---|
| 7-Cl | CH₂CH₂N(CH₃)₂ | base | a 121.0–122.8 |
| 7-Cl | CH₂CH₂N(C₂H₅)₂ | 2HCl | b,c 279.4–283.0 |
| 5-Cl | CH₂CH₂N(CH₃)₂ | 2H₃PO₄ | b 252.4 |
| 5-Cl | CH₂CH₂N(C₂H₅)₂ | 2H₃PO₄ | 226.4–228.6 |
| 5-Cl | CH₂CH₂CH₂N(CH₃)₂ | 2H₃PO₄ | 233.6–236.2 |
| 5-Cl | CH₂CH₂CH₂N(C₂H₅)₂ | 2H₃PO₄ | 244.6–247.4 |
| 5-Cl | CH₂CH₂N(C₄H₉-n)₂ | 2H₃PO₄ | 214.6–217.0 |
| 3-Cl | CH₂CH₂N(C₂H₅)₂ | 2HCl | 219.0–226.4 |
| 3,7-di-Cl | CH₂CH₂N(C₂H₅)₂ | base | 67.2–73.4 |
| 6,7-di-Cl | CH₂CH₂N(C₂H₅)₂ | base | 116.4–118.0 |
| 8-OCH₃ | CH₂CH₂N(C₂H₅)₂ | base | 126.2–128.8 |
| 6-OCH₃ | CH₂CH₂N(C₂H₅)₂ | base | 94.8–98.8 |
| H | CH₂CH₂N(CH₃)₂ | 2HCl | 224.8–227.0 |
| H | CH₂CH₂N(C₂H₅)₂ | 2HCl.H₂O | 135.6–138.8 |
| H | CH₂CH₂N(C₂H₅)₂ | 2HCl | 138.6–143.6 | a Base shown by Tarbell et al., JACS 68, 1217 (1946).
b With decomposition.
c Base and diphosphate shown by Surrey et al., JACS 68, 113 (1946).

The acid-addition salts of the basic quinolines of Table A were converted into their free base form for use as intermediates in the preparation of the compounds of the invention. This was done by dissolving the salt in water, adding an alkaline agent such as ammonium hydroxide to the aqueous solution to liberate the basic quinoline, extracting the basic quinoline with an organic solvent such as chloroform and removing the organic solvent by distilling in vacuo to leave the basic quinoline.

B. *1-arylmethyl-4-[lower-(quaternary-ammonium)-alkylimino]quinoline salts*

The preparation of these compounds in the form of their acid-addition salts is illustrated by the following preparation of the hydrochloride of 7-chloro-1-(2-chlorobenzyl) - 4 - (2 - diethylaminoethylimino) - 1,4 - dihydroquinoline omega-(2-chlorobenzochloride): A reaction mixture containing 3 g. of 7-chloro-4-(2-diethylaminoethylamino)quinoline, 4.03 g. of 2-chlorobenzyl chloride and 50 cc. of acetonitrile was refluxed with stirring for twenty-four hours on a steam bath. The solvent was removed by distilling in vacuo, and the residue was triturated with acetone to yield 5 g. of solid melting at 163–171° C. Several recrystallizations of this solid from isopropanol-ethyl acetate gave the purified product, 7 - chloro - 1 - (2 - chlorobenzyl) - 4 - (2 - diethylaminoethylimino)-1,4-dihydroquinoline omega-(2-chlorobenzochloride) hydrochloride, M.P. 172.2–174.2° C. (corr.).
Analysis.—Calcd. for C₂₉H₃₂Cl₅N₃: Cl⁻, 11.82; N, 7.01. Found: H₂O, 3.63; Cl⁻, 11.17 (11.59 dry basis); N, 6.63 (6.88 dry basis).

Alternatively, as discussed hereinabove, 7-chloro-1-(2-chlorobenzyl) - 4 - (2 - diethylaminoethylimino) - 1,4-dihydroquinoline omega-(2-chlorobenzochloride) hydrochloride can be called 7-chloro-1-(2-chlorobenzyl)-4-[2 - (N - 2 - chlorobenzyl - N,N - diethylammonium)-ethylamino]quinolinium dichloride or 7-chloro-4-(2-diethylaminoethylamino)quinoline bis(2-chlorobenzochloride).

7 - chloro - 1 - (2 - chlorobenzyl) - 4- (2 - diethylaminoethylimino)-1,4-dihydroquinoline omega-(2-chlorobenzochloride) hydrochloride was also prepared by reacting 7-chloro-1-(2-chlorobenzyl)-4-(2-diethylaminoethylimino)-1,4-dihydroquinoline hydrochloride [or 7-chloro-1 - (2 - chlorobenzyl) - 4 - (2 - diethylaminoethylamino)-quinolinium chloride] with at least one molar equivalent, preferably an excess, of 2-chlorobenzyl chloride, as follows: A mixture of 5.0 g. of 7-chloro-1-(2-chlorobenzyl)-4-(2-diethylaminoethylimino)-1,4-dihydroquinoline hydrochloride [preparation described in copending application Serial No. 666,764, filed June 19, 1957], 7.35 g. of 2-chlorobenzyl chloride and 40 cc. of acetonitrile was refluxed for twenty-four hours. The solvent was removed by distilling in vacuo and the residue was triturated with ether to yield a solid, which was collected and recrystallized from acetonitrile to yield 3.0 g. of product, 7-chloro-1 - (2 - chlorobenzyl) - 4 - (2 - diethylaminoethylimino)-1,4-di-hydroquinoline omega-(2-chlorobenzochloride) hydrochloride, M.P. 167.5–168.5° C. A mixed melting point with the compound obtained by reacting 7-chloro-4-(2-diethylaminoethylamino)quinoline with two or more molar equivalents of 2-chlorobenzyl chloride was not depressed.

Following the procedure described in the immediately preceding paragraph but using 3.0 g. of 7-chloro-1-(2-chlorobenzyl)-4-(2-diethylaminoethylimino)-1,4-dihydroquinoline in free base form (instead of the hydrochloride), 1.17 g. of 2-chlorobenzyl chloride and 25 cc. of acetonitrile, there was obtained 10 g. of 7-chloro-1-(2-chlorobenzyl)-4-(2-diethylaminoethylimino)-1,4-dihydroquinoline omega-(2-chlorobenzochloride), M.P. 150.5–152.5° C. with decomposition when recrystallized from ethanol-ethyl acetate.
Analysis.—Calcd. for C₂₉H₃₁Cl₄N₃: Cl, 25.2. Found: Cl, 25.71.

7 - chloro - 1 - (2 - chlorobenzyl) - 4 - (2 - diethylaminoethylimino)-1,4-dihydroquinoline omega-(2-chlorobenzochloride) also can be prepared by reacting the above omega-(2-chlorobenzochloride) hydrochloride with an acid-acceptor as follows: To a solution of 3 g. of 7 - chloro - 1 - (2 - chlorobenzyl) - 4 - (2 - diethylaminoethylimino)-1,4-dihydroquinoline omega-(2-chlorobenzochloride) hydrochloride in 10 ml. of methanol was added a solution of 0.3 g. of potassium hydroxide in 5 ml. of methanol. There was an immediate separation of potassium chloride which was filtered off and found to weigh 0.35 g. (theory for KCl is 0.378 g.). The methanol was removed in vacuo from the filtrate and the residue, which solidified, was recrystallized from isopropanol-ether to yield 7-chloro-1-(2-chlorobenzyl)-4-(2-diethylaminoethylimino)-1,4-dihydroquinoline omega-2-(chlorobenzochloride), M.P. 154–157° C. The hydrochloride was reformed as follows: To a solution of 0.50 g. of 7-chloro-1-(2-chlorobenzyl)-4-(2-diethylaminoethylimino)-1,4-dihydroquinoline omega-(2-chlorobenzochloride) in about 3 cc. of isopropanol was added 1 cc. of 4 N methanolic hydrogen chloride. The resulting solution was boiled for about five minutes, diluted with about 0.5 cc. of ethyl acetate, and chilled in an ice bath. The crystalline precipitate was collected to yield 0.44 g. of 7-chloro-1-(2-chlorobenzyl)-4-(2-diethylaminoethylimino)-1,4-dihydroquinoline omega-2-chlorobenzochloride) hydrochloride, M.P. 167–169° C. There was no depression of melting point when a mixed melting point was taken with the above product obtained by reaction of 7-chloro-4-(2-diethylaminoethylamino)quinoline with two or more molar equivalents of 2-chlorobenzyl chloride.

Other 1-arylmethyl-4-[lower-(quaternary-ammonium)-alkylimino]-quinoline salts that can be prepared following the above procedure using the appropriate 4-(tertiary-aminoalkylamino)-quinoline and arylmethyl esters of a strong acid include: 3,7-dichloro-4-(4-diethylaminobutylimino)-1-(3-nitrobenzyl)-1,4-dihydroquinoline omega-(3-nitrobenziodide) hydriodide using 3,7-dichloro-4-(4-diethylaminobutylamino)quinoline and 3-nitrobenzyl iodide; 6,7-dichloro-4 - [2 - (1-piperidyl)ethylimino]-1-(2-methoxybenzyl)-1,4-dihydroquinoline omega - (2-methoxybenzochloride) hydrochloride using 6,7 - dichloro - 4 - [2-(1-piperidyl)ethylamino]quinoline and 2 - methoxybenzyl chloride; 7-bromo-4-(2-di-n-hexylaminoethylimino)-1-(2,4-dimethoxybenzyl)-1,4-dihydroquinoline omega-(2,4-dimethoxybenzobromide) hydrobromide using 7-bromo-4-(2-di-n-hexylaminoethylamino)quinoline and 2,4-dimethoxybenzyl bromide; 8-chloro-4-[3-(1-pyrrolidyl)propylimino]-1-(2,4,6 - trimethoxybenzyl)-1,4-dihydroquinoline omega - (2,4,6 - trimethoxybenzochloride) hydrochloride using 8-chloro-4-[3-(1-pyrrolidyl)propylamino]quinoline and 2,4,6-trimethoxybenzyl chloride; 4-(3-diethylamino-2-propylimino)-1-(3-ethylbenzyl) - 7 - trifluoromethyl-1,4-dihydroquinoline omega - (3-ethylbenziodide) hydriodide using 4-(3-diethylamino-2-propylamino)-7-trifluoromethylquinoline and 3-ethylbenzyl iodide; 1-(2,4-dibromobenzyl) - 4 - [2-(N-ethyl-N-2-hydroxyethylamino)ethylimino]-3-nitro-1,4-dihydroquinoline omega-(2,4-dibromobenzobromide) hydrobromide using 4-[2-(N-ethyl-N-2-hydroxyethylamino)ethylamino]-3-nitroquinoline and 2,4-dibromobenzyl bromide; 1-(2-chloro-4-methoxybenzyl-6,8 - dimethoxy-4-[2-(4-methyl-1-piperidyl)ethylimino]-1,4-dihydroquinoline omega - (2-chloro-4-methoxybenzochloride) hydrochloride using 6,8-dimethoxy-4-[2-(4-methyl-1-piperidyl)ethylamino]quinoline and 2-chloro - 4 - methoxybenzyl chloride; 4-[2-(N-benzyl-N-ethylamino)ethylimino]-8-n-butoxy - 1 - (2,4,6-trichlorobenzyl)-1,4-dihydroquinoline omega-(2,4,6-trichlorobenzochloride) hydrochloride using 4-[2-(N-benzyl-N-ethylamino)ethylamino]-8-n-butoxyquinoline and 2,4,6-trichlorobenzyl chloride; 4-[2-(4-morpholinyl)ethylimino] - 6 - n - hexoxy - 1-(3-trifluoromethylbenzyl) - 1,4-dihydroquinoline omega-(3-trifluoromethylbenzochloride) hydrochloride using 4-[2-(4-morpholinyl)ethylamino]-6-n-hexoxyquinoline and 3-trifluoromethylbenzyl chloride; 4-[3-(N-cyclohexyl-N-methylamino)propylimino] - 7 - methylmercapto - 1-(2-methylmercaptobenzyl)-1,4-dihydroquinoline omega-(2-methylmercaptobenziodide) hydriodide using 4-[3-(N-cyclohexyl-N-methylamino)propylamino] - 7 - methylmercaptoquinoline and 2-methylmercaptobenzyl iodide; 1-(2-chlorobenzyl)-4-[2-(N-ethyl - N - methylamino)ethylimino]-8-isobutylmercapto - 1,4 - dihydroquinoline omega - (2-chlorobenzochloride) hydrochloride using 4-[2-(N-ethyl-N-methylamino)ethylamino] - 8 - isobutylmercaptoquinoline and 2-chlorobenzyl chloride; 7-chloro-1-(2-chlorobenzyl) - 4 - (2-diethylaminoethylimino) - 6-methoxy-1,4-dihydroquinoline omega-(2 - chlorobenzochloride) hydrochloride using 7-chloro-4-(2-diethylaminoethylamino)-6-methoxyquinoline and 2 - chlorobenzyl chloride; and the like. These compounds are converted into their free base form by reaction with an acid-acceptor according to the procedure given above for the conversion of 7-chloro-1-(2-chlorobenzyl)-4-(2-diethylaminoethylimino) - 1,4 - dihydroquinoline omega - (2-chlorobenzochloride) hydrochloride into its corresponding omega-(2-chlorobenzochloride) by reaction with potassium hydroxide in methanol.

EXAMPLE 2

7 - chloro - 1 - (2 - chlorobenzyl) - 4 - (2 - dimethylaminoethylimino) - 1,4 - dihydroquinoline omega - (2-chlorobenzochloride) hydrochloride This preparation was carried out following the procedure given in Example 1B using 5.0 g. of 7-chloro-4-(2 - dimethylaminoethylamino)quinoline, 5.8 g. of 2-chlorobenzyl chloride, 25 cc. of acetonitrile and a reflux period of forty-eight hours. There was thus obtained 7.5 g. (66% yield) of the product, 7-chloro-1-(2-chlorobenzyl)-4-(2-dimethylaminoethylimino) - 1,4 - dihydroquinoline omega - (2-chlorobenzochloride) hydrochloride in the form of its monohydrate, M.P. 182.8–185.2° C. (corr.) with decomposition when recrystallized from ethanol-ethyl acetate.

Anal.—Calcd. for $C_{27}H_{27}Cl_4N_3 \cdot HCl \cdot H_2O$: Cl⁻, 12.02; N, 7.13; $H_2O$, 3.06. Found: Cl⁻, 11.52; N, 6.71; $H_2O$, 3.24.

7-chloro - 1 - (2 - chlorobenzyl)-4-(2-dimethylaminoethylimino)-1,4-dihydroquinoline omega-(2-chlorobenzochloride) is formed from the above-described omega-(2-chlorobenzochloride) hydrochloride by reaction with an acid-acceptor following the procedure described in Example 1B.

EXAMPLE 3

7 - chloro - 1 - (2,4 - dichlorobenzyl) - 4 - (2 - diethylaminoethylimino) - 1,4 - dihydroquinoline omega - (2,4 - dichlorobenzochloride) hydrochloride This preparation was carried out following the procedure described in Example 1B using 10 g. of 7-chloro-4-(2-diethylaminoethylamino)quinoline, 28.2 g. of 2,4-dichlorobenzyl chloride, 50 cc. of acetonitrile and a reflux period of about twenty-four hours. There was thus obtained 9.2 g. of the product, 7-chloro-1-(2,4-dichlorobenzyl)-4-(2-diethylaminoethylimino) - 1,4 - dihydroquinoline omega - (2,4-dichlorobenzochloride) hydrochloride, M.P. 149.4–153.2° C. (corr.) when recrystallized several times from acetonitrile.

Anal.—Calcd. for $C_{29}H_{29}Cl_6N_3 \cdot HCl$: Cl⁻, 10.60; N, 6.28. Found: Cl⁻, 10.91; N, 6.49.

7-chloro - 1 - (2,4-dichlorobenzyl)-4-(2-diethylaminoethylimino)-1,4-dihydroquinoline omega - (2,4-dichlorobenzochloride) is obtained from the corresponding omega-(2,4-dichlorobenzochloride) hydrochloride by reacting it with an acid-acceptor.

EXAMPLE 4

7 - chloro - 1 - (2 - chlorobenzyl) - 4 - (2 - dimethylaminoethylimino) - 1,4 - dihydroquinoline omega-methochloride hydrochloride A reaction mixture containing 7 g. of 7-chloro-1-(2-chlorobenzyl)-4-(2-dimethylaminoethylimino) - 1,4 - dihydroquinoline hydriodide, 10 g. of methyl iodide and 50 cc. of absolute ethanol was allowed to stand overnight at room temperature. There was thus obtained 8.5 g. (93% yield) of 7-chloro-1-(2-chlorobenzyl)-4-(2-dimethylaminoethylimino) - 1,4 - dihydroquinoline omega-methiodide hydriodide, M.P. 266–267° C. (uncorr.) with decomposition. This product was dissolved in hot ethanol and was ion-exchanged using 13 g. of an ion-exchange resin saturated with chloride ions (such as Amberlite ® IRA–400 ion-exchange resin supplied by Rohm and Haas Co.) suspended in ethanol. The eluant upon evaporation yielded a material which was crystallized from ethanol-ether to give 5 g. of product, 7-chloro-1-(2-chlorobenzyl) - 4 - (2-dimethylaminoethylimino)-1,4 - dihydroquinoline omega - methochloride hydrochloride, M.P. 247.8–249.8° C. (corr.) with decomposition.

Anal.—Calcd. for $C_{21}H_{24}Cl_3N_3 \cdot HCl$: Cl⁻, 15.37; N, 9.11. Found: H₂O, 2.89; Cl⁻, 15.20 (D.B.); N, 9.17 (D.B.).

7-chloro-1-(2-chlorobenzyl) - 4 - (2 - dimethylaminoethylimino)-1,4-dihydroquinoline omega-methochloride can be obtained from the above corresponding omega-methochloride hydrochloride by reacting it with an acid-acceptor or by reacting 7-chloro-1-(2-chlorobenzyl)-4-(2-dimethylaminoethylimino) - 1,4 - dihydroquinoline with methyl chloride (or by reacting it with methyl iodide and converting the resulting methiodide into the methochloride by treating it with an ion-exchange resin saturated with chloride ions according to the above procedure).

By substitution of the methyl iodide in the preceding example by a molar equivalent amount of n-propyl iodide, isobutyl iodide or n-hexyl iodide, there can be obtained, after the ion-exchange step, 7-chloro-1-(2-chlorobenzyl)-4-(2-dimethylaminoethylimino)-1,4-dihydroquinoline omega-n-propochloride hydrochloride, 7-chloro-1-(2-chlorobenzyl) - 4 - (2 - dimethylaminoethylimino) - 1,4-dihydroquinoline omega-isobutochloride hydrochloride or 7-chloro - 1 - (2-chlorobenzyl)-4-(2-dimethylaminoethylimino) - 1,4 - dihydroquinoline omega-n-hexochloride hydrochloride, respectively.

By substitution of the methyl iodide in the preceding example by a molar equivalent amount of n-butyl bromide, benzyl chloride or 2-methoxybenzyl chloride and omitting the ion-exchange step, there can be obtained, respectively, 7 - chloro-1-(2-chlorobenzyl)-4-(2-dimethylaminoethylimino) - 1,4 - dihydroquinoline omega-n-butobromide hydrobromide, 7-chloro-1-(2-chlorobenzyl)-4-(2-dimethylaminoethylimino) - 1,4-dihydroquinoline omega-benzochloride hydrochloride or 7-chloro-1-(2-chlorobenzyl)-4-(2-dimethylaminoethylimino)-1,4-dihydroquinoline omega-(2-methoxybenzochloride) hydrochloride.

EXAMPLE 5

*7 - chloro - 1 - (2 - chlorobenzyl)-4-(2-diethylaminoethylimino)-1,4-dihydroquinoline omega-methochloride hydrochloride*

This preparation was carried out following the procedure described in Example 4 using 9 g. of 7-chloro-1-(2 - chlorobenzyl) - 4-(2-diethylaminoethylimino)-1,4-dihydroquinoline hydriodide, 12 g. of methyl iodide and 150 cc. of ethanol. There was thus obtained 9 g. (78% yield) of 7-chloro-1-(2-chlorobenzyl)-4-(2-diethylaminoethylimino)-1,4-dihydroquinoline omega-methiodide hydriodide, M.P. 155–156° C. (uncorr.) with decomposition. Treatment of this methiodide hydriodide with 65 g. of an ion-exchange resin saturated with chloride ions (such as Amberlite ® IRA-400 ion-exchange resin) in methanol-water yielded 7.5 g. of the corresponding omega-methochloride hydrochloride, which when recrystallized from isopropanol gave 4.5 g. (70% yield) of product in the form of its isopropanolate, M.P. 210.0–210.4° C. (corr.).

*Anal.*—Calcd. for C₂₃H₂₈Cl₃N₃·HCl·C₃H₇OH: Cl⁻, 12.91; C, 56.84; H, 6.74. Found: Cl⁻, 13.01; C, 57.04; H, 6.48.

EXAMPLE 6

*5 - chloro - 1 - (2-chlorobenzyl)-4-(2-dimethylaminoethylimino) - 1,4 - dihydroquinoline omega-(2-chlorobenzochloride) hydrochloride*

This preparation was carried out following the procedure described in Example 1B using 7.0 g. of 5-chloro-4-(2-dimethylaminoethylamino)quinoline, 13.5 g. of 2-chlorobenzylchloride, 50 cc. of acetonitrile and a reflux period of twenty-four hours. There was thus obtained 13.3 g. (83% yield) of the product, 5-chloro-1-(2-chlorobenzyl) - 4 - (2 - dimethylaminoethylimino) - 1,4-dihydroquinoline omega-(2-chlorobenzochloride) hydrochloride, M.P. 200.8–201.8° C. (corr.) when recrystallized from ethanol.

*Anal.*—Calcd. for C₂₇H₂₇Cl₄N₃·HCl: Cl⁻, 12.40; N, 7.35. Found: H₂O, 3.46; Cl⁻, 11.75 (D.B.); N, 7.30 (D.B.).

EXAMPLE 7

*1-benzyl-5-chloro-4-(2-diethylaminoethylimino)-1,4-dihydroquinoline omega-benzochloride hydrochloride*

This preparation was carried out following the procedure described in Example 1B using 7.6 g. of 5-chloro-4-(2-diethylaminoethylamino)quinoline, 3.4 g. of benzyl chloride, 35 cc. of acetonitrile and a reflux period of twenty-four hours. There was thus obtained 2.6 g. (23% yield) of product, 1-benzyl-5-chloro-4-(2-diethylaminoethylimino) - 1,4 - dihydroquinoline omega-benzochloride hydrochloride, M.P. 206.0–208.0° C. (corr.) with decomposition when recrystallized from isopropanol-ethyl acetate.

*Anal.*—Calcd. for C₂₉H₃₃Cl₂N₃·HCl: Cl⁻, 13.36; N, 7.92. Found: Cl⁻, 13.17; N, 7.99.

EXAMPLE 8

A. *5-chloro-1-(2-chlorobenzyl)-4-(2 - diethylaminoethylimino)-1,4-dihydroquinoline omega - (2 - chlorobenzochloride)*

Ten grams of 5-chloro-1-(2-chlorobenzyl)-4-(2-diethylaminoethylimino)-1,4-dihydroquinoline, 4 g. of 2-chlorobenzyl chloride and 50 cc. of acetonitrile were heated under reflux for twenty-four hours. The solvent was removed in vacuo and the residual oily material was triturated with ether whereupon solidification resulted. The solid was recrystallized twice from ethanol-acetone to give 7.8 g. (56% yield) of the product, 5-chloro-1-(2-chlorobenzyl) - 4 - (2 - diethylaminoethylimino) - 1,4 - dihydroquinoline omega-(2-chlorobenzochloride), melting point indefinite starting at 115.4° C. (corr.).

*Anal.*—Calcd. for C₂₉H₃₁Cl₄N₃: Cl⁻, 6.30; N, 7.46. Found: Cl⁻, 6.02; N, 7.23.

By substitution of the 2-chlorobenzyl chloride in the preceding example by a molar equivalent amount of 2-ethoxybenzyl chloride, 2,4-dibromobenzyl bromide or ethyl iodide, there can be obtained, respectively, 5-chloro-1-(2-chlorobenzyl)-4-(2-diethylaminoethylimino) - 1,4 - dihydroquinoline omega-(2-ethoxybenzochloride), 5-chloro-1-(2-chlorobenzyl) - 4 - (2 - diethylaminoethylimino)-1,4-dihydroquinoline omega-(2,4-dibromobenzobromide) or 5-chloro-1-(2-chlorobenzyl)-4-(2 - diethylaminoethylimino)-1,4-dihydroquinoline omega-ethiodide.

By stirring an aqueous solution of 5-chloro-1-(2-chlorobenzyl)-4-(2-diethylaminoethylimino) - 1,4 - dihydroquinoline omega-(2-chlorobenzochloride) with an excess of silver oxide, filtering the suspension, and neutralizing the filtrate with at least two molar equivalents of sulfuric acid, phosphoric acid, acetic acid, lactic acid, tartaric acid, quinic acid or methanesulfonic acid, there can be obtained, respectively, 5-chloro-1-(2-chlorobenzyl)-4-(2-diethylaminoethylimino)-1,4-dihydroquinoline omega-(2-chlorobenzosulfate) sulfate, 5-chloro-1-(2-chlorobenzyl)-4-(2-diethylaminoethylimino)-1,4-dihydroquinoline omega-(2-chlorobenzophosphate) phosphate, 5-chloro-1-(2-chlorobenzyl)-4-(2-diethylaminoethylimino) - 1,4 - dihydroquinoline omega-(2-chlorobenzoacetate) acetate, 5-chloro-1-(2-chlorobenzyl) - 4 - (2 - diethylaminoethylimino)-1,4-dihydroquinoline omega - (2 - chlorobenzolactate) lactate, 5 - chloro-1-(2-chlorobenzyl)-4-(2-diethylaminoethylimino)-1,4-dihydroquinoline omega-(2-chlorobenzotartrate) tartrate, 5-chloro-1-(2-chlorobenzyl)-4-(2-diethylaminoethylimino)-1,4-dihydroquinoline omega-(2-chlorobenzoquinate) quinate, or 5-chloro-1-(2-chlorobenzyl)-4-(2-diethylaminoethylimino) - 1,4 - dihydroquinoline omega-(2-chlorobenzomethanesulfonate) methanesulfonate. Treatment of each of these compounds with one molar equivalent of an acid-acceptor, e.g., potassium hydroxide as in Example 1B, yields the 5-chloro- 1-(2-chlorobenzyl) - 4 - (2 - diethylaminoethylimino)-1,4-dihydroquinoline quaternary ammonium salt, e.g., omega-(2-chlorobenzosulfate), etc.

B. *5-chloro-1-(2-chlorobenzyl)-4-(2 - diethylaminoethylimino)-1,4-dihydroquinoline omega - (2 - chlorobenzochloride) hydrochloride*

5-chloro-1-(2-chlorobenzyl)-4-(2 - diethylaminoethylimino)-1,4-dihydroquinoline omega-(2-chlorobenzochloride) (1.27 g.) was dissolved in 15 cc. of methanol. The solution was treated with 5.6 cc. of 4 N methanolic hydrogen chloride and heated to boiling. Ether was added to the point of turbidity and the mixture was allowed to stand one week at about 0° C. The precipitate that separated was collected to give 0.74 g. (55% yield) of product, 5-chloro-1-(2-chlorobenzyl)-4-(2-diethylaminoethylimino) - 1,4 - dihydroquinoline omega - (2 - chlorobenzochloride) hydrochloride, M.P. 172–173° C. (uncorr.).

*Anal.*—Calcd. for $C_{29}H_{31}Cl_4N_3 \cdot HCl$: Cl⁻, 11.82. Found: Cl⁻, 11.96.

By substitution of the hydrogen chloride in the preceding example with a molar equivalent amount of hydrogen bromide, phosphoric acid, sulfuric acid or methanesulfonic acid, there can be obtained, respectively, 5-chloro-1 - (2 - chlorobenzyl) - 4 - (2 - diethylaminoethylimino)-1,4-dihydroquinoline omega-(2-chlorobenzochloride) hydrobromide, 5-chloro-1-(2-chlorobenzyl)-4-(2-diethylaminoethylimino)-1,4-dihydroquinoline omega-(2-chlorobenzochloride) phosphate, 5-chloro-1-(2-chlorobenzyl) - 4 - (2 - diethylaminoethylimino) - 1,4 - dihydroquinoline omega-(2-chlorobenzochloride) sulfate or 5-chloro-1 - (2 - chlorobenzyl) - 4 - (2 - diethylaminoethylimino) - 1,4 - dihydroquinoline omega - (2 - chlorobenzochloride) methanesulfonate.

EXAMPLE 9

A. *7-chloro-1 - (2 - chlorobenzyl) - 4 - (3 - diethylaminopropylimino)-1,4-dihydroquinoline omega - (2 - chlorobenzochloride) hydrochloride*

This preparation was carried out following the procedure described in Example 1B using 5.0 g. of 7-chloro-4-(3-diethylaminopropylamino)quinoline, 13.7 g. of 2-chlorobenzyl chloride, 25 cc. of acetonitrile and a reflux period of twenty-four hours. There was thus obtained 10.0 g. (96% yield) of the product, 7-chloro-1-(2-chlorobenzyl)-4-(3 - diethylaminopropylimino) - 1,4 - dihydroquinoline omega-(2-chlorobenzochloride) hydrochloride, M.P. 192.4–195.4° C. (corr.) with decomposition when recrystallized from acetonitrile-methanol.

*Anal.*—Calcd. for $C_{30}H_{33}Cl_4N_3 \cdot HCl$: Cl⁻, 11.55; N, 6.84. Found: Cl⁻, 11.31; N, 6.84.

B. *7-chloro-2 - (2 - chlorobenzyl) - 4 - (3 - diethylaminopropylimino)-1,4-dihydroquinoline omega - (2-chlorobenziodide) hydriodide*

A solution of 5 g. of 7-chloro-4-(3-diethylaminopropylamino) quinoline and 2.61 g. of 2-chlorobenzyl chloride in 50 cc. of acetonitrile was refluxed for twenty-four hours. The solvent was removed by distilling in vacuo and the residue was recrystallized from isopropanol-ethyl acetate to yield 3.9 g. of 7-chloro-1-(2-chlorobenzyl)-4-(3 - diethylaminopropylimino) - 1,4 - dihydroquinoline omega-(2-chlorobenzochloride) hydrochloride, which was dissolved in water and the aqueous solution was extracted with chloroform. To the aqueous layer was added an excess of potassium iodide and the solid which separated was recrystallized from ethanol-ethyl acetate, yielding the product, 7-chloro-2-(2-chlorobenzyl)-4-(3 - diethylaminopropylimino) - 1,4 - dihydroquinoline omega-(2-chlorobenziodide) hydriodide, M.P. 205.4° C. (corr.) with softening at 194.2° C.

*Anal.*—Calcd. for $C_{30}H_{33}Cl_3IN_3 \cdot HI$: I⁻, 31.9; N, 5.28. Found: H₂O, 2.59; I⁻, 31.9 (D.B.); N, 5.44 (D.B.).

EXAMPLE 10

*5-chloro-1-(2-chlorobenzyl)-4 - (3 - diethylaminopropylimino)-1,4-dihydroquinoline omega - (2 - chlorobenzochloride) hydrochloride*

This preparation was carried out following the procedure given in Example 1B using 8.8 g. of 5-chloro-4-(3-diethylaminopropylamino) quinoline, 10.4 g. of 2-chlorobenzyl chloride, 50 cc. of acetonitrile and a reflux period of twenty-four hours. There was thus obtained 8.0 g. (43% yield) of the product, 5-chloro-1-(2-chlorobenzyl)-4-(3 - diethylaminopropylimino) - 1,4 - dihydroquinoline omega-(2-chlorobenzochloride) hydrochloride, M.P. 131.4–136.2° C. (corr.) when recrystallized from isopropanol-ethyl acetate.

*Anal.*—Calcd. for $C_{30}H_{33}Cl_4N_3 \cdot HCl$: Cl⁻, 11.55; N, 6.84. Found: H₂O, 7.01; Cl⁻, 11.53 (D.B.); N, 6.94 (D.B.).

An aqueous solution of 2 g. of 5-chloro-1-(2-chlorobenzyl) - 4 - (3 - diethylaminopropylimino)-1,4-dihydroquinoline omega-(2-chlorobenzochloride) hydrochloride was made basic with 35% aqueous sodium hydroxide solution and the resulting mixture was extracted with ethylene dichloride. The extract was dried, evaporated to dryness in vacuo, and the remaining solid was recrystallized from isopropanol to yield 1 g. of 5-chloro-1 - (2 - chlorobenzyl) - 4 - (3-diethylaminopropylimino)-1,4-dihydroquinoline omega-(2-chlorobenzochloride) as its mono-isopropanolate, M.P. 137–142° C.

*Anal.*—Calcd. for $C_{30}H_{33}Cl_4N_3 \cdot C_3H_7OH$: C, 62.29; H, 6.48; N, 6.59; Cl, 22.29; Cl⁻, 5.56; O, 2.51. Found: C, 62.50; H, 5.99; N, 6.57; Cl, 22.13; Cl⁻, 5.30; O, 2.50, 3.20.

EXAMPLE 11

*7 - chloro - 1 - (2 - chlorobenzyl) - 4 - (3-dimethylaminopropylimino)-1,4-dihydroquinoline omega - methochloride hydrochloride*

This preparation was carried out following the produce given above in Example 4 using 4 g. of 7-chloro-1-(2-chlorobenzyl) - 4 - (3 - dimethylaminopropylimino)-1,4-dihydroquinoline hydriodide, 5.7 g. of methyl iodide and 50 cc. of absolute methanol. There was thus obtained 5.2 g. (100% yield) of 7-chloro-1-(2-chlorobenzyl)-4 - (3 - dimethylaminopropylimino)-1,4-dihydroquinoline omega-methiodide hydriodide, M.P. 250° C. (uncorr.), which was converted into the corresponding omega-methochloride hydrochloride, M.P. 243.2–247.2° C. (corr.) with decomposition, using 50 g. of an ion-exchange resin saturated with chloride ions (such as Amberlite® IRA–400 ion exchange resin) suspended in ethanol.

*Anal.*—Calcd. for $C_{22}H_{26}Cl_3N_3 \cdot HCl$: Cl⁻, 14.93; N, 8.85. Found: H₂O, 1.80; Cl⁻, 14.85 (D.B.); N, 8.63 (D.B.).

EXAMPLE 12

*7-chloro-1 - (2 - chlorobenzyl) - 4-(4-diethylaminobutylimino) - 1,4 - dihydroquinoline omega-(2-chlorobenzochloride) hydrochloride*

A solution of 2 g. of 7-chloro-1-(2-chlorobenzyl)-4-(4-diethylaminobutylimino)-1,4-dihydroquinoline hydrochloride and 2.8 g. of 2-chlorobenzyl chloride in 50 cc. of acetonitrile and 5 cc. of ethanol was refluxed for twenty-four hours. After removing the solvents in vacuo, the residue was triturated with ether to yield 2.7 g. (85% yield) of solid which was recrystallized from methanol-acetonitrile to yield the product, 7-chloro-1-(2-chlorobenzyl) - 4 - (4 - diethylaminobutylimino) - 1,4 - dihydroquinoline omega-(2-chlorobenzochloride) hydrochloride, M.P. 187.0–190.0° C. (corr.).

*Anal.*—Calcd. for $C_{31}H_{35}Cl_4N_3 \cdot HCl$: Cl⁻, 11.29; N, 6.69. Found: Cl⁻, 11.22; N, 6.83.

By substitution of the 2-chlorobenzyl chloride of the preceding example by a molar equivalent amount of 2-methoxybenzyl chloride, 2-chloro-4-methoxybenzyl bromide or 2,4-diiodobenzyl iodide, there can be obtained, respectively, 7 - chloro-1-(2-chlorobenzyl)-4-(2-diethylaminoethylimino)-1,4-dihydroquinoline omega-(2 - methoxybenzochloride) hydrochloride, 7-chloro-1-(2-chlorobenzyl)-4-(2 - diethylaminoethylimino)-1,4-dihydroquinoline omega-(2-chloro-4-methoxybenzobromide) hydrobromide or 7-chloro-1-(2-chlorobenzyl)-4-(2-diethylaminoethylimino) - 1,4 - dihydroquinoline omega-(2,4-diiodobenziodide) hydriodide.

EXAMPLE 13

*1-(2-chlorobenzyl)-4-(2-diethylaminoethylimino)-3-methyl-1,4-dihydroquinoline omega-(2-chlorobenzochloride) hydrochloride*

This preparation was carried out following the procedure described in Example 1B using 15 g. of 4-(2-diethylaminoethylamino)-3-methylquinoline, 46.7 g. of 2-chlorobenzyl chloride, 50 cc. of acetonitrile and a reflux period of twenty-four hours. There was thus obtained 26.9 g. (80% yield) of the product, 1-(2-chlorobenzyl)-4-(2-diethylaminoethylimino) - 3 - methyl-1,4-dihydroquinoline omega - (2 - chlorobenzochloride) hydrochloride, M.P. 163.4–165.2° C. (corr.) when recrystallized from methanol-acetonitrile.

*Anal.*—Calcd. for $C_{30}H_{34}Cl_3N_3 \cdot HCl$: Cl⁻, 12.24; N, 7.25. Found: $H_2O$, 3.48; Cl⁻, 12.4 (D.B.); N, 7.44 (D.B.).

By substitution for 4-(2-diethylaminoethylamino)-3-methylquinoline in the preceding example with an equivalent amount of 7-n-butyl-4-(2-diethylaminoethylamino)-quinoline, 4-(3-diethyl-aminopropylamino)-5-ethylquinoline or 4-(2-diethylaminoethylamino)-3,7-dimethylquinoline, there can be obtained 7-n-butyl-1-(2-chlorobenzyl)-4 - (2 - diethylaminoethylimino) - 1,4 - dihydroquinoline omega-(2-chlorobenzochloride) hydrochloride, 1-(2-chlorobenzyl)-4-(3-diethylaminopropylimino)-5-ethyl-1,4 - dihydroquinoline omega-(2-chlorobenzochloride) hydrochloride or 1 - (2-chlorobenzyl)-4-(2-diethylaminoethylimino) - 3,7-dimethyl-1,4-dihydroquinoline omega-(2-chlorobenzochloride) hydrochloride, respectively.

EXAMPLE 14

*1 - benzyl-4-(2-diethylaminoethylimino)-1,4-dihydroquinoline omega-benzochloride hydrochloride*

This preparation was carried out following the procedure described in Example 1B using 7 g. of 4-(2-diethylaminoethylamino)-quinoline, 3.8 g. of benzyl chloride, 60 cc. of acetonitrile and a reflux period of eighteen hours. There was thus obtained 1.4 g. (17% yield) of the product, 1 - benzyl-4-(2-diethylaminoethylimino)-1,4-dihydroquinoline omega - benzochloride hydrochloride, M.P. 202.4–203.2° C. (corr.) with decomposition when precipitated from ethanol solution with ether.

*Anal.*—Calcd. for $C_{29}H_{34}ClN_3 \cdot HCl$: Cl⁻, 14.28; N, 8.46. Found: Cl⁻, 14.12; N, 8.25.

Pharmacological evaluation of the compounds of the invention have shown them to possess hypotensive activity which is primarily central in origin as measured by the serial carotid occulsion procedure in dogs anesthetized with sodium barbital or morphine-chloralose and by the cross-circulation technic in dogs; by administration intravenously or orally in unanesthetized dogs; and by the renal hypertensive rat test. In contrast to a high central hypotensive activity, these compounds were found to have relatively low ganglionic blocking activity as measured by the standard nicitating membrane test in cats, for example, being less active than hexamethanonium bromide.

The compounds of the invention can be formulated for use in the same way as conventional hypotensive agents, such as reserpine preparations, and indeed can be used advantageously in combination with such hypotensive agents. They can be formulated into tablets or capsules for oral administration or dissolved under sterile conditions for parenteral injection.

I claim:

1. A composition of matter selected from the group consisting of: (a) a 1-arylmethyl-4-(quaternary-ammonium-alkylimino) - 1,4 - dihydroquinoline having the structural formula

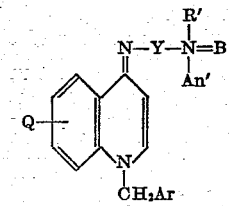

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Y is lower-alkylene having from two to four carbon atoms and having its connecting linkages on different carbon atoms, N=B is lower-tertiary-amino selected from the group consisting of di-(lower-alkyl)amino, N-(lower-alkyl) - N - (lower-cycloalkyl)-amino, N - (lower-alkyl)-N-(lower-hydroxyalkyl)amino, N-(lower - alkyl) - N - [(monocarbocyclic-aryl)methyl]-amino, 1-piperidyl,(lower-alkylated)-1-piperidyl, 1-pyrrolidyl, (lower-alkylated)-1-pyrrolidyl and 4-morpholinyl, R' is a member selected from the group consisting of lower-alkyl and (monocarbocyclic-aryl)methyl, An' is a pharmacodynamically acceptable anion and ArCH₂ is (monocarbocyclic-aryl)methyl, wherein (monocarbocyclic-aryl)-methyl in each instance represents a member selected from the group consisting of benzyl, nitrobenzyl, (lower-alkoxylated) - benzyl, (lower-alkylated)-benzyl, halogenated-benzyl, trifluoromethylbenzyl and (lower-alkylmercapto)-benzyl; and (b) pharmacodynamically acceptable acid-addition salts thereof.

2. A pharmacodynamically acceptable acid-addition salt of a 1-arylmethyl-5-halo-4-(quaternary-ammonium-alkylimino)-1,4-dihydroquinoline having in free base form the structural formula

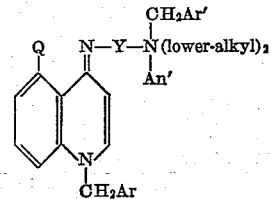

where Q is halo, Y is lower-alkylene having from two to four carbon atoms and having its connecting linkages on different carbon atoms, An' is a pharmacodynamically acceptable anion, and Ar and Ar' are each halophenyl.

3. A pharmacodynamically acceptable acid-addition salt of a 1-arylmethyl-7-halo-4-(quaternary-ammonium-alkylamino)-1,4-dihydroquinoline having in free base form the structural formula

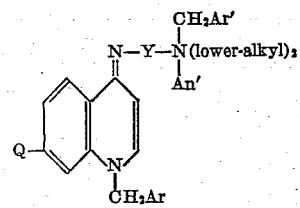

where Q is halo, Y is lower-alkylene having from two to four carbon atoms and having its connecting linkages on different carbon atoms, An' is a pharmacodynamically acceptable anion, and Ar and Ar' are each halophenyl.

4. An acid-addition salt of 1-arylmethyl-4-(quaternaryammonium-alkylimino)-1,4-dihydroquinoline having the structural formula

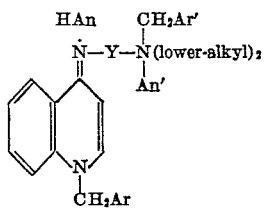

where Y is lower-alkylene having from two to four carbon atoms and having its connecting linkages on different carbon atoms, An' and An are each pharmacodynamically acceptable anions, and Ar and Ar' are each halophenyl.

5. 5 - chloro - 1 - (2 - chlorobenzyl) - 4 - (2 - diethylaminoethylimino)-1,4-dihydroquinoline omega-(2-chlorobenzohalide).

6. A hydrohalide of 5-chloro-1-(2-chlorobenzyl)-4-(2-diethylaminoethylimino)-1,4-dihydroquinoline omega-(2-chlorobenzohalide).

7. A hydrohalide of 7-chloro-1-(2-chlorobenzyl)-4-(2-diethylaminoethylimino)-1,4-dihydroquinoline omega-(2-chlorobenzohalide).

8. A hydrohalide of 7-chloro-1-(2-chlorobenzyl)-4-(4-diethylaminobutylimino)-1,4-dihydroquinoline omega-(2-chlorobenzohalide).

9. A hydrohalide of 1-benzyl-4-(2-diethylaminoethylimino)-1,4-dihydroquinoline omega-benzohalide.

References Cited in the file of this patent
UNITED STATES PATENTS

| | | |
|---|---|---|
| 2,454,949 | Shonle et al. | Nov. 30, 1948 |
| 2,526,417 | Reitsema | Oct. 17, 1950 |

OTHER REFERENCES

Surrey et al.: Jour. Am. Chem Soc., vol. 68, pp. 1244–1246 (1946).